United States Patent
Baumgartner et al.

[15] 3,636,241
[45] Jan. 18, 1972

[54] TELEPHONE CABLE SPLICE CASE

[72] Inventors: Robert Garland Baumgartner, Baltimore; Kenneth Chambers Maclean, Phoenix, both of Md.

[73] Assignee: Bell Telephone Laboratories, Incorporated, Murray Hill, N.J.

[22] Filed: Nov. 23, 1970

[21] Appl. No.: 91,843

[52] U.S. Cl. ........................174/92, 174/77 R, 174/88 R
[51] Int. Cl. .................................................H02g 15/08
[58] Field of Search .............174/92, 88 R, 21 R, 93, 77 R, 174/22 R, 91

[56] References Cited

UNITED STATES PATENTS 3,061,666  10/1962  Duvall et al. ..........................174/92
3,337,681  8/1967  Smith .................................174/92

Primary Examiner—Darrell L. Clay
Attorney—R. J. Guenther and Edwin B. Cave

[57] ABSTRACT

This disclosure describes a splice closure for telephone cable pairs. The closure consists of a pair of plastic covers with metal lining or coating, and end plates of differing designs to accommodate from one to six cables. Internally, the closure includes a metallic harness at each end with outer and inner metal clamps placed around the cable and linked together with insulated metal tie bars. The closure is hermetically sealed at the faceplate-cover interface by a butyl rubber sealing compound. An air escape is included in the end plate to avoid air entrapment at the interface.

10 Claims, 9 Drawing Figures

PATENTED JAN 18 1972

INVENTORS  R. G. BAUMGARTNER
K. C. MACLEAN
BY Charles E. Frans
ATTORNEY

PATENTED JAN 18 1972

TELEPHONE CABLE SPLICE CASE

FIELD OF THE INVENTION

This invention relates to hermetic telephone cable closures in general; and particularly to telephone splice case closures.

BACKGROUND OF THE INVENTION

Although many telephone closure designs are in existence, the conditions of installation and working environment are so diverse and involved that no one closure concept to date has been adequate for all purposes.

Closures are used in the aerial, underground, and buried plant. Differing corrosion and stress factors occur in these environments. Closures wherever located are routinely reentered by splicers to effect new or revised pair splices as the need arises. Present closure designs often require extensive disassembly before splicing can commence.

Further, many cables have a gastight feature which must be maintained at the closure. The integrity of the cable seals is increasingly crucial, especially with the prospect of higher frequencies to be transmitted over telephone pairs and the attendant tighter tolerances over parameters which are readily affected by changes in the cable interior moisture content.

Accordingly, one object of the invention is to realize a telephone cable closure with greater gastight integrity.

A further object of the invention is to simplify the installation and reentry of cable closures.

A further inventive object is to achieve a mechanically strong closure which is simple to install and reenter without compromising either mechanical strength or gastight, watertight integrity.

SUMMARY OF THE INVENTION

Pursuant to the invention, mechanical strength is achieved by a harness assembly at each end of the splice closure, which includes outer and inner metallic clamps placed on the prepared ends of the cables to be joined, and linked together with insulated metallic tie bars. The clamping means perform only a clamping function, the cable seals being provided by end plates to which the clamping assembly is attached, in conjunction with the closures' two-piece outer shell or casing. Advantageously, these are molded thermoplastic parts which, pursuant to one aspect of the invention, are drawn together by metal inserts which are placed in receptacles molded into the plastic parts. The inserts in one embodiment are made of sintered stainless steel and are characterized by a large flat bearing area and a square boss. The height of the boss may be chosen so that with the capscrew inserted and torqued, the entire assembly can be set to come together with a controlled amount of tension on the capscrew, which then acts as a spring to permanently lock together the plastic members embraced between them. Advantageously, however, any insert may be replaced in the field.

In the end plates, corrugations are used in the cable sear area which, pursuant to a further facet of the invention, include air escape corridors. During the closure assembly, as the end plate sections are brought together, the corridors allow air to escape as the sealant is compressed. This avoids trapping air at the interface with its attendant reduction of adhesive surface.

The invention and its further objects, features, and advantages will be more readily apprehended from a reading of the detailed description to follow of an illustrative embodiment.

DETAILED DESCRIPTION OF AN ILLUSTRATIVE EMBODIMENT

Figure 1:
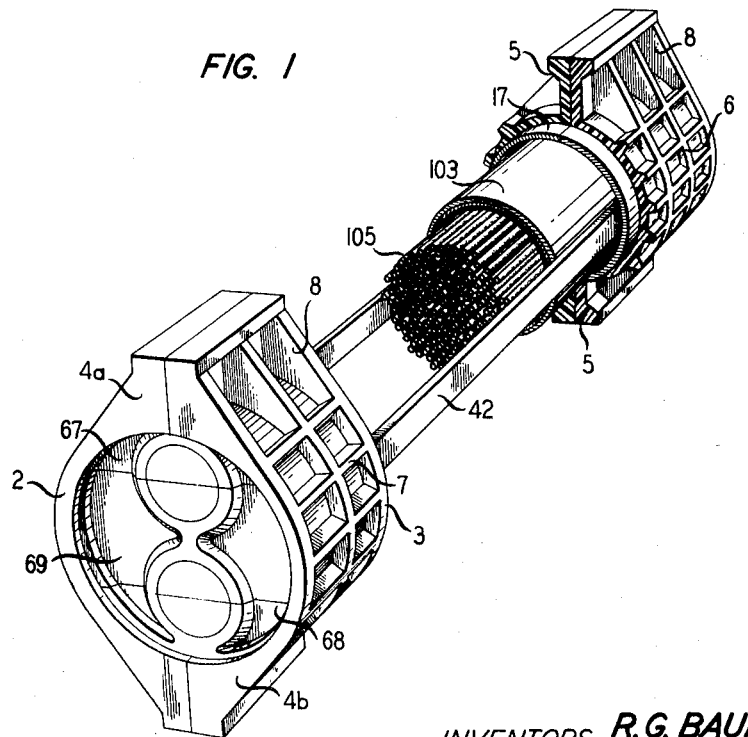
FIG. 1 is a frontal perspective view in partial cutaway of the cable closure.

FIG. 1 shows a closure constructed according to the present invention and consisting of a two-piece outer cover designated 1 comprising a top shell 2 and a bottom shell 3. The shells 2, 3 are each semicylindrical in overall shape, and each has longitudinal, outwardly extending edge flanges 4a, 4b on either side. Each flange 4a, 4b has an upturned edge 5.

Figure 2:
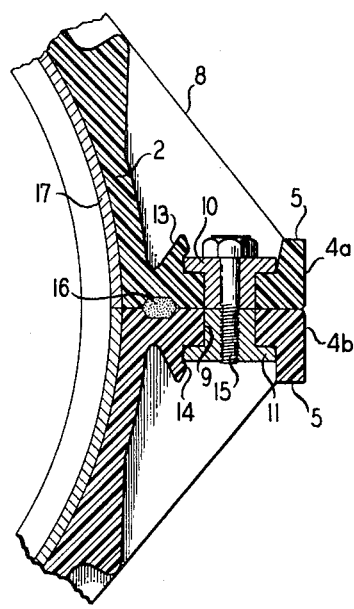
FIG. 2 is a side sectional view of locking means for the cable covers.

A number of spaced parallel ribs 6, 7 run longitudinally on the skin of top shell 2 and of bottom shell 3. Also a plurality of spaced transverse ribs are formed in the top and bottom shells 2, 3. The ribs 6, 7 constitute a honeycomblike reenforcing structure for the outer cover. A web 8 joins each transverse rib 6 with the flanges 4a, 4b at the edge 5 as seen in FIG. 2, further rigidifying the flanges.

Figure 7:
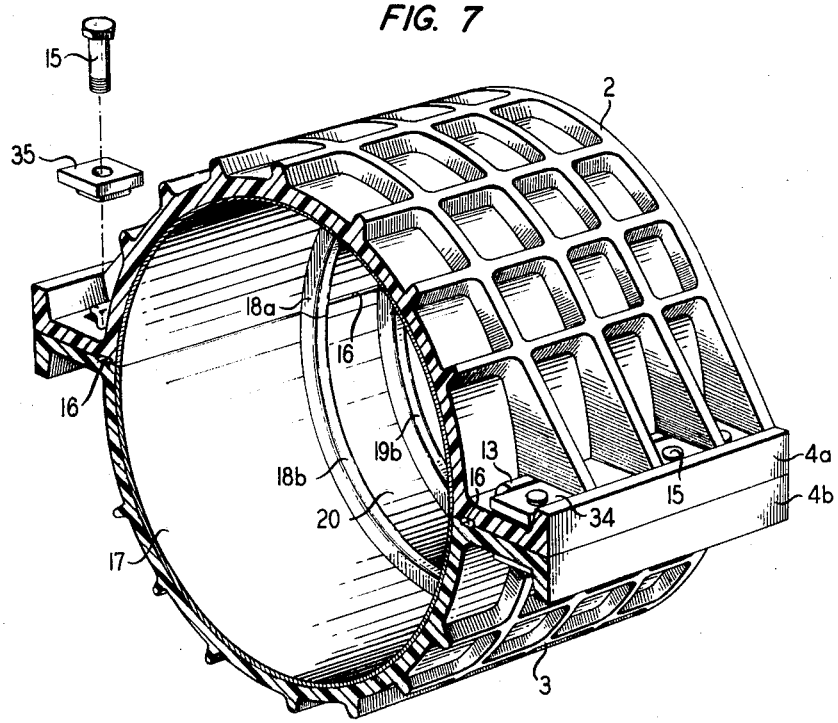
FIG. 7 is a front partial perspective diagram showing the closure covers joined.
Figure 5:
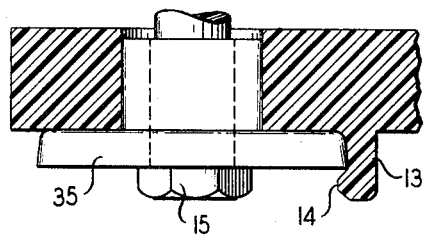
FIG. 5 is a sectional side view of fasteners for the closure.

Along each flange 4a, 4b, interspersed along the flange at intervals a number of square passages 9 are provided between adjacent webs. As seen in FIG. 2, the passages 9 in flange 4b, for example, accept an insert 10 having an unthreaded chamber; while the passages in flange 4a accept an insert 11 with a threaded chamber. The inserts 10, 11 advantageously have square bosses 12, such as seen in FIG. 7. FIG. 5 shows a tab 13 formed on the surface of flange 4a and 4b and having a lip 14, serves to snap-mount and retain the respective inserts 10, 11. Advantageously, the inserts 10, 11 are placed in position during the factory assembly by forcing them past the lip 14. This approach avoids having to press-fit the inserts which risk distorting the covers; or molding the inserts in place, in which case replacement in the field is difficult if the need should arise. Advantageously, the inserts are made of sintered stainless steel. The height of the square boss 12, pursuant to the invention, can be selected so that with the capscrew 15 inserted and sufficiently torqued, the top and bottom shells 2, 3 come together with bosses contacting, to provide a controlled amount of tension on the capscrew 15. This, then, acts as a spring with which the plastic shells 2, 3 are locked in position. Even if they cold-flow, the shells cannot cause the spring tension to decrease. Further, if the capscrew 15 should cross-thread or gall in the insert, the insert can readily be replaced by moving the lip 14 back far enough to enable the insert to be removed.

As seen in FIG. 7, the interior of the top and bottom shells 2, 3 comprise a generally cylindrical enclosure. The interface between the shells 2, 3 is formed as in FIG. 2 to provide a chamber 16 which, prior to assembly, is filled with sealant. A shielding layer 17 of suitable material such as aluminum foil is secured to the interior side of shells 2, 3 respectively, in the region between two spaced, inwardly extending interior ribs 18a, 18b formed respectively in the top and bottom shells 2, 3. Alternatively, by suitable electroplating methods of metallic plating such as copper may be placed on desired portions of the interior surface of the shells 2, 3 as well as the end plates to be described. One method calls for an electroless deposition of a nickel substrate first, which acts as a primer for later electrolytic deposition of copper. At the edge of each shell 2, 3, a second spaced rib set 19a, 19b is formed. The chamber thus defined between the two-rib sets 18a, 18b and 19a, 19b, which are designated 20, serves to receive a sealant.

SINGLE-CABLE END PLATE STRUCTURE

Figure 3:
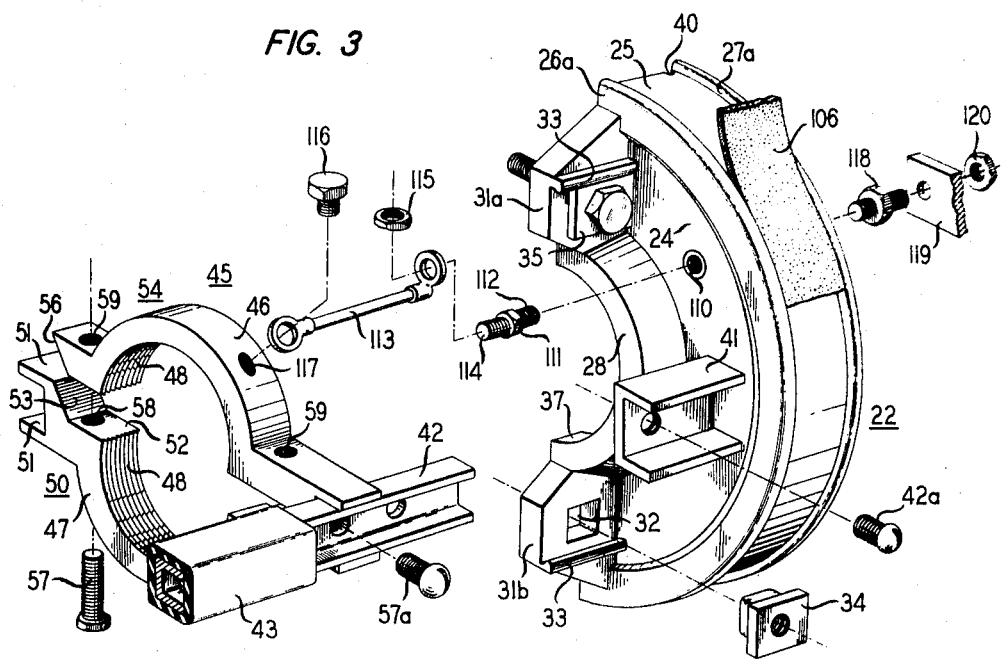
FIG. 3 is an exploded side perspective view of a closure end plate and clamp.

A structure for gripping a single cable and for mounting same within the outer cover 1 is shown in FIG. 3. The end plate includes a right shell 22 shown in FIG. 3, and an identical left shell 23 shown in FIG. 6. The shell 22 consists of a body 24 supporting a rim 25 bounded by a pair of annular outer ribs 26a and 27a. Similarly, the left shell 23 includes a body portion 24 supporting a rim 25 bounded by annular ribs 26b, 27b as seen in FIG. 6.

Inwardly of body 24 on each of the shells 22, 23 is a semicylindrical flange section 28, 29 respectively. The flange 29 of shell 23 is bracketed to the body 24 by the mounting flange 30a, 30b. Similarly, the semicylindrical flange 28 is bracketed to body 24 of right shell 22 by the mounting flanges 31a, 31b, seen partially in FIG. 3.

Figure 6:
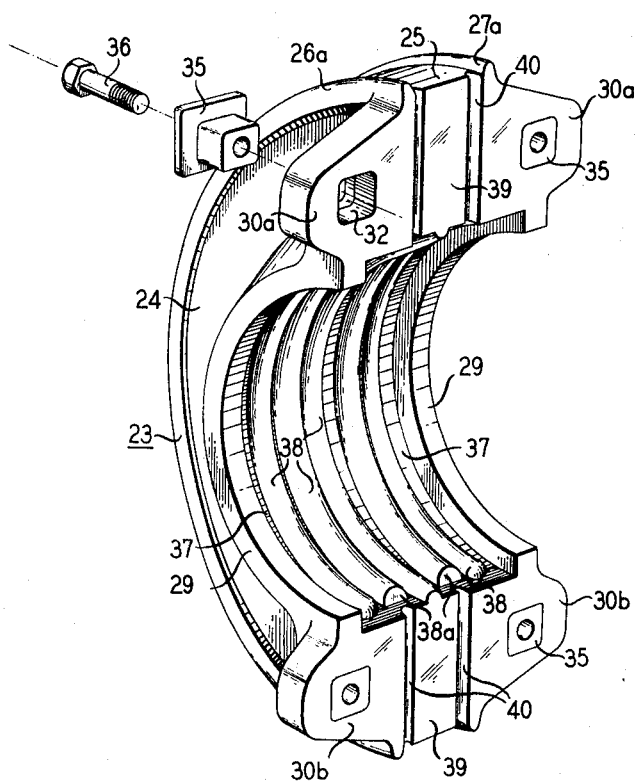
FIG. 6 is a side perspective view of one-half of an end plate.

The flanges 30a, 30b, 31a, 31b, each has a square orifice 32 as seen in FIGS. 3 and 6. Adjacent to each orifice 32, on its exterior side, is a ridge 33 such as seen in FIG. 3. Threaded inserts 34, and unthreaded inserts such as 35 are placed in matching pairs in the orifices 32 and a threaded fastener 36 is used to draw down the opposing inserts 34, 35.

Figure 8:
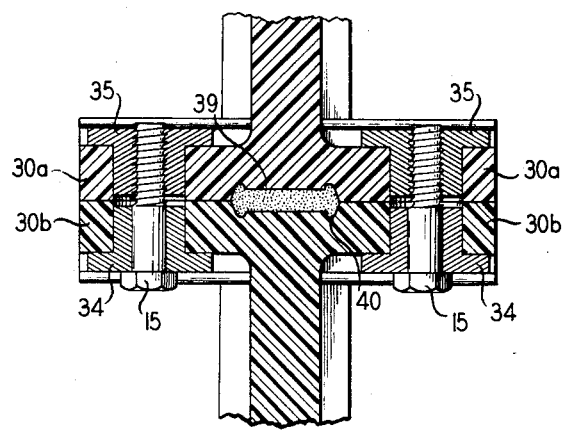
FIG. 8 is a sectional side detail view showing the joining of two end plate sections.

Along the interior surface 37 of flange 28, there are provided a number of arcuate parallel ridges 38, best seen in FIG. 6 in conjunction with the left shell 23. The ends 38a of each ridge 38 stop short of the flange surface 30b. Between the two legs of flange 30a, and of flange 30b as well, is provided a depressed surface 39 bounded in each case by a pair of grooves 40. The latter extend as seen in FIG. 6, inwardly toward the ridges 38. When the right and left shells 22, 23 are joined as seen in FIG. 8, the surface 39 and associated grooves 40 form a sealing compound chamber.

Midway atop the semicylindrical flanges 28, 29, as illustrated in FIG. 3, a U-shaped saddle 41 is fastened. There thus are two saddles 41 for each single cable end plate 21, spaced 180° apart along the flanges 28, 29. The saddles 41 each receive a U-shaped tie bar 42 which fastens to the saddle as with bolt 42a. Either end of the two tie bars 42 thus is connected to a saddle 41 which, pursuant to the invention, affords a strong mechanical linking between the two end plates of the closure. Inwardly of its ends, each tie bar 42 is fully insulated with a jacket 43 as shown in FIG. 3.

Attaching across tie bars 42 is an outer cable clamp 45 consisting of a top member 46 and a bottom member 47. Each member 46, 47 includes a corrugated semicircular interior surface 48, which engages the outer cable jacket such as 49 in FIG. 4 with its corrugations.

Figure 4:
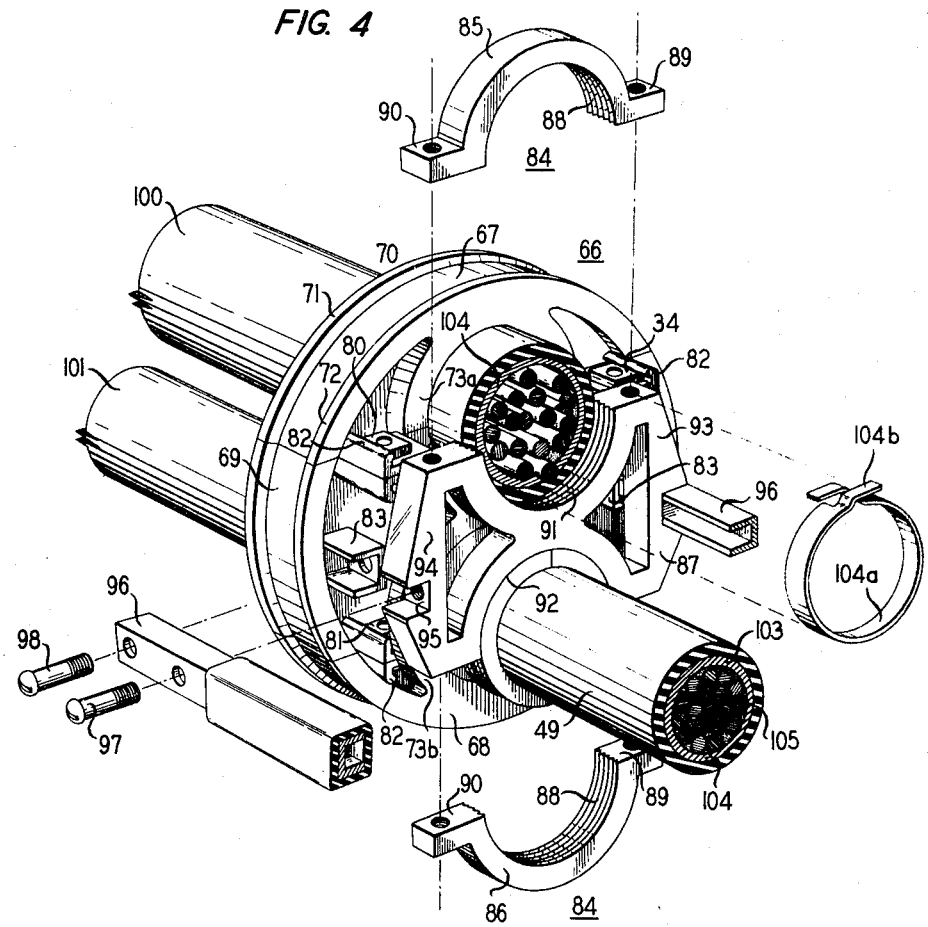
FIG. 4 is an exploded side perspective view of a second embodiment of end plate.

The members 46, 47 are identically shaped. A first end 50 of each member includes a pair of spaced outwardly extending arms 51, the upper arm joining to a flat surface 52 through the tapered surface 53. A second end of 54 includes a flat 55, and outwardly thereof a tapered surface 56. The two cable clamp members 46, 47 are brought together by threaded fastener such as 57 through an unthreaded hole 59 in end 50 and engaging a threaded hole 58 in end 54. An inner sheath clamp 104a shown in FIG. 4 is contacted by the corrugations of surface 48. In a similar such expedient the cable clamp arms at the other end are joined. The clamp when assembled is attached to the tie bar 42 by engagement of the spaced arms 51 at either end around the tie bar and fastening of the assembly thereto by, for example, the threaded hex head capscrew 57a.

GAS PRESSURE INLET

For multipair cables which are internally pressurized, it is necessary to afford a gas pressure inlet to the assembled housing of the present invention. To this end, a threaded orifice 110 is provided as a molded-in-place insert in the end plate half as shown in FIG. 3. Normally, orifice 110 is used as a gas pressure inlet and is fitted with an external pipe plug only. It can also provide external ground and in this use it accommodates the threaded end 112 of a lug 111. A strap 113 is fastened to the other end 114 of lug 111 as with nut 115; and the second end of the strap then is fastened as with bolt 116 to clamp 45 and the threaded hole 117 therein. The system thus affords an electrical grounding path from the cable clamp 45 to the exterior of the closure. The path is completed by inserting a second two-ended lug 118 from the exterior side of orifice 110 thus to contact lug 111. A grounding bar 119 then is attached to the other end of lug 118 as with a bolt nut 120. The grounding bar 119 in turn may be attached to any suitable exterior ground.

DOUBLE-CABLE END PLATE

As seen in FIG. 4 a double-cable end plate 65 can be used in place of the single-cable end plate of FIG. 3 on either or both closure ends. End plate 66 comprises an upper crescent 67 and a lower crescent 68 in between which is a midsection 69. The exterior surfaces of the elements 67, 68, 69, form a cylindrical rim 70 bounded by annular outer ribs 71, 72, in the same fashion as obtains for a single-cable end plate 21. The upper and lower crescents 67, 68 each includes a semicylindrical flange 73a, 73b respectively. These serve the same function as flanges 28, 29 of the single-cable end plate of FIG. 3. The interior semicylindrical surfaces of upper and lower crescents 67, 68 comprise the same ribbed construction with arcuate ridges 78 as has been described with respect to FIG. 6.

Figure 9:
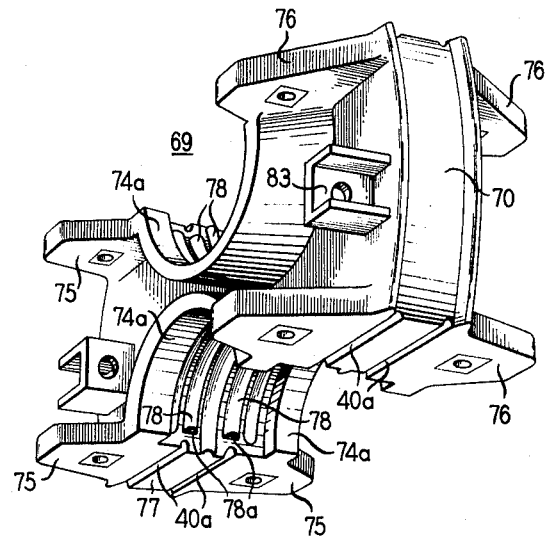
FIG. 9 is a frontal perspective view of the midsection of a second end plate embodiment.

Midsection 69, shown in FIG. 9, includes two semicylindrical interior surfaces 74. Each surface 74 terminates at a pair of mounting flanges 75, 76. The rim 70 surface is joined with a depressed surface 77 which bisects the flanges 75, 76. Along the semicylindrical interior surfaces 74 a plurality of arcuate ridges 78 are formed, which advantageously are substantially equivalent to the ridges 38 explained earlier with respect to FIG. 6.

Midsection 69 also includes a pair of tie-bar saddles 83 fastened on opposite central portions of the interior side.

A square passage 79 is placed at the end of each of the flanges 75, 76, to accommodate square threaded and unthreaded inserts 80, 81 such as shown in FIG. 4. To aid in retaining each of the inserts 80, 81, a lip 82 is provided adjacent each square hole.

A two-cable clamp designated 84 is shown in exploded perspective view in FIG. 4. Outer clamp 84 consists of a top half 85, a bottom half 86 and a center section 87. Top and bottom halves 85, 86 include a semicylindrical and corrugated interior surface 88 within flanges 89, 90. Center section 87 includes two oppositely facing semicylindrical surfaces 91, 92 each also corrugated. The surfaces 91, 92 are reenforced by a pair of walls 93, 94. At the center point in each wall 93, 94, a notch 95 with a threaded passage is provided to receive and secure the tie bars 96 as with capscrew 97. A second fastening is made between the tie bar 96 and the saddles 83 as with capscrew 98. An inner sheath clamp 104a shown in FIG. 4 is placed on cable 100 for contacting metallic sheath 104. Tabs 104b then afford electrical contact to the clamp metallic top half 85.

The semicircular interior flange 28 as shown in FIG. 6 is bounded by circular flanges 29. The surfaces of the latter are above the top portions of the ridges 38. Similarly, the interior cylindrical surfaces of the upper and lower crescents 67, 68 as well as the two semicylindrical flanges 73a, 73b of the midsection 69 of end plate type 66 are also bounded by semicircular wall portions, such as the flange 29. For the midsection 69, shown in FIG. 9, the wall portion is designated 74a.

METHOD OF ASSEMBLY

A cable 100 such as shown in FIG. 4 is prepared for connection to a two-cable splice closure of the present invention first by building up of a layer approximately 1½ inches wide of a suitable sealing compound such as butyl rubber between a pair of washers (not shown) placed on the cable in conventional fashion. Then the lower crescent 68 of double-cable end plate 66 is placed over the washers, the wall portions 74a fully enveloping the two washers. Next, an amount of sealing compound is placed in the depressed surfaces 77, and the end plate midsection 69 is placed over the washers, the washers being embraced inwardly of the wall portions 74a. In a similar fashion, a second cable 101 is prepared and placed between the second semicylindrical surface of midsection 69 and upper crescent 67. When the cable 100 is in place, the upper crescent 67 is tightened down upon the midsection 69 and similarly when cable 101 is in place, the lower crescent 68 is tightened.

It is inevitable that in applying the faceplate elements to the cable jacket a certain amount of air be trapped beneath the sealing compound. This air should be expelled to achieve the maximum possible adhesion to the end plate surfaces. Pursuant to the invention, the trapped air lying beneath the sealing compound escapes in paths between the ridges 78. The air then bleeds along the path between the ridge ends 78a and the grooves 40a and thence on through the grooves.

After the first end plate is assembled, the second end plate for the other end of the closure is then assembled in like fashion. The second end plate can be either a single- or a double-cable type. Thereafter, tie bars such as 96 are placed in position in the manner described. The outer clamps such as clamp 45 for the single-cable end plate and clamp 84 for the double-cable end plate, are placed into contact with the cable jacket 103 and also the sheath 104 through the inner clamp 104a and its tabs 104b. Inner clamp 104a is inserted over the sheath 104 in conventional fashion. Telephone cable pairs then are spliced together in conventional fashion; and thereafter all splices are protected with one or two outer wraps and electrical shielding.

Next, a ribbon 106 of sealing compound is placed in the rim of the end plate, such as in rim 25 of FIG. 3. The bottom shell 3 is placed under the end plates, the latter being embraced between the ribs 18a, 19a and 18b, 19b shown in FIG. 7. A length of sealing cord then is placed in the indentation of bottom shell 3 that defines half of the sealant chamber 16 as shown in FIG. 2, at and along both sides of the bottom shell. Chamber 16 is seen to join the volume within the last-named ribs. Finally, the top shell 2 is placed over the bottom shell 3 and capscrews are inserted and tightened into the inserts 10, 11.

It is seen that this assembly provides sealant chambers between the top and bottom shells 2, 3 and also along the entire periphery of the end plates where these join the top and bottom shells 2, 3.

It is to be understood that the embodiments described herein are merely illustrative of the principles of the invention. Various modifications may be made thereto by persons skilled in the art without departing from the spirit and scope of the invention.

What is claimed is:

1. A closure for composite, sheathed multipair telephone cable comprising:
   an outer plastic cover comprising top and bottom mating shells, each with semicylindrical interior surfaces and a pair of spaced arcuate ribs formed at said surface ends, said shells having mating flanges extending outwardly along either side and having upturned edges, said flanges having matching grooves defining a closed chamber, bonding sealant in said chamber, plural longitudinal and plural circular transverse ribs formed on the outer surface of each said shell, each said transverse rib including an end web joining said flange upturned edge;
   first and second circular-rimmed end plates closely fitting between the respective said spaced arcuate ribs, bonding sealant between said rim and said arcuate ribs, each said end plate comprising means for enveloping said cable jacket;
   first and second cable-gripping means inwardly of the respective said end plates; and
   tie bar means for mechanically connecting said gripping means and for mounting said end plates.

2. A closure pursuant to claim 1, wherein each said end plate further comprises a pair of annular outer ribs at the edge of said outer rim said ribs mounting in respective contacting relation between said spaced arcuate ribs of said mating shell.

3. A closure pursuant to claim 2, wherein each said end plate further comprises two or more dissemblable sections, and wherein said jacket-enveloping means comprises one or more pairs of semicylindrical surfaces each said surface comprising raised end walls and plural annular spaced ribs of lesser height than said end walls, each of said surfaces terminating in two mounting flanges each with a depressed midregion, defined between a pair of spaced notches placed widthwise across each said flange, the notch interior ends being closely adjacent said rib ends, and the notch exterior ends extending to the end plate rim surface.

4. A closure pursuant to claim 2, wherein each said end plate further comprises a pair of oppositely mounted saddles for receiving said tie bar means, and wherein the latter comprises U-shaped metallic rods with full insulative cover therearound except at their end portions, and means connecting each said end portion to a respective said end plate saddle.

5. A closure pursuant to claim 2, wherein said gripping means comprises two or more metallic clamps each having at least one semicylindrical corrugated interior surface, means for effecting electrical and mechanical contact between said surfaces and said cable sheath, means for fastening said clamps together, said clamps further comprising two open U-shaped slots for snug engaging and securing to said tie bar.

6. A closure pursuant to claim 2, further comprising means for joining said shells comprising plural square holes with bossed threaded and unthreaded inserts therein, one said hole located between each said web, said inserts slightly spaced apart when said flanges are in contact, said shells being drawn together by said bosses with a controlled force until said bosses contact.

7. A closure pursuant to claim 6 further comprising a metallic foil layer disposed on said shell interior surfaces between the two inwardmost said arcuate ribs, said foil serving as a shield for telephone conductors in said cable.

8. A closure pursuant to claim 7, further comprising tab means extending upwardly adjacent each said flange hole, said tab means firmly engaging one side of each associated said insert and fixing same in said hole.

9. A closure pursuant to claim 8 further comprising separate gastight grounding means connected to each said sheath gripping means, and leading through said end plate for connection externally to a ground.

10. A closure comprising: first and second semicylindrical plastic covers each having interior metallic lining, longitudinal joining flanges, and recessed end wells, end glands chambered in said end wells and comprising one or more axial circular entrances for passing cable, each entrance including circular rib means for trapping sealing compound and transverse airbleeder corridors, each gland having two or more flanged sections, sintered stainless steel boss means embedded in each said section, means for adjusting the height of each said boss, and screw means for bringing together said bosses.

* * * * *